United States Patent [19]

Glauz et al.

[11] Patent Number: 4,720,359
[45] Date of Patent: Jan. 19, 1988

[54] WRAPPED FAN CYLINDER FOR WATER COOLING TOWER

[75] Inventors: Robert S. Glauz, Shawnee; Joyce D. Holmberg, Overland Park, both of Kans.

[73] Assignee: The Marley Cooling Tower Company, Mission, Kans.

[21] Appl. No.: 922,163

[22] Filed: Oct. 23, 1986

[51] Int. Cl.[4] .............................................. B01F 3/04
[52] U.S. Cl. .................................. 261/24; 261/109; 415/213 C; 415/190; 285/424
[58] Field of Search ..................... 415/213 C, 190; 285/424, 192; 126/119; 261/24, 109; 138/39

[56] References Cited

U.S. PATENT DOCUMENTS

| | | | |
|---|---|---|---|
| 826,676 | 7/1906 | Magee | 126/119 |
| 2,536,130 | 1/1951 | Herrman | 415/213 C |
| 2,680,603 | 6/1954 | Taylor . | |
| 2,681,179 | 5/1950 | Fordyce . | |
| 2,814,435 | 11/1957 | Fordyce . | |
| 2,963,783 | 12/1960 | Field | 285/424 |
| 3,390,499 | 7/1968 | Jansson | 285/424 |
| 3,433,403 | 3/1969 | Gerlitz | 415/213 C |
| 3,437,319 | 4/1969 | Engalitcheff, Jr. et al. | 261/109 |
| 3,445,093 | 5/1969 | Reder . | |
| 3,606,404 | 9/1971 | McGann, Jr. | 285/424 |
| 3,708,155 | 1/1973 | Holmberg et al. . | |
| 3,780,999 | 12/1973 | Fordyce . | |
| 3,995,663 | 12/1976 | Perry | 138/39 |
| 4,156,706 | 5/1979 | Bell, Jr., et al. . | |
| 4,637,903 | 1/1987 | Bardo et al. | 261/24 |

FOREIGN PATENT DOCUMENTS

| | | | |
|---|---|---|---|
| 591386 | 1/1960 | Canada | 126/119 |
| 3242185 | 5/1984 | Fed. Rep. of Germany | 415/213 C |
| 2056005 | 3/1981 | United Kingdom | 285/424 |

*Primary Examiner*—Tim Miles
*Attorney, Agent, or Firm*—Schmidt, Johnson, Hovey & Williams

[57] ABSTRACT

An initially flat sheet of a fan cylinder assembly is formed to an exact cylindrical configuration in such a manner that less than 20% of the material comprising the sheet in a direction along the thickness of the same is exposed to stress above the yield strength of the material. The sheet is provided with tabs bent to a perpendicular orientation relative to remaining regions of the sheet, and holes are punched in certain of the tabs at precise, predefined locations and which are related to precise, predefined locations of apertures spaced around the periphery of an exact circular opening in an upright support panel of the tower housing. The sheet is formed to a true cylinder by causing the major region of the sheet to bear against the periphery of the circular opening of the support panel so that the flat panel functions as a guide both during forming of the cylinder and also thereafter to retain the sheet in its proper cylindrical configuration. In an alternate embodiment of the invention, an annular member comprised of expanded foam material is secured to the support panel opposite the fan cylinder for reducing turbulence of the air flowing from the fill structure and through the fan cylinder.

9 Claims, 10 Drawing Figures

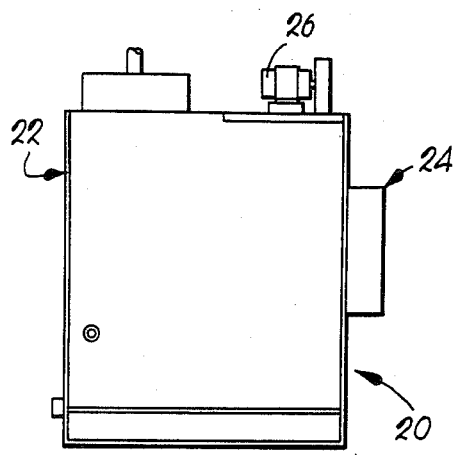
Fig.1.
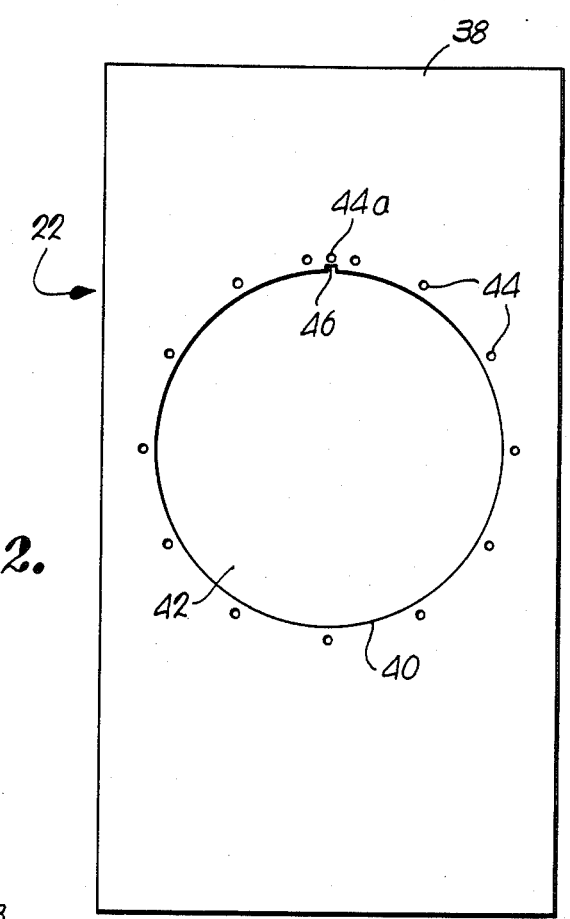
Fig.2.
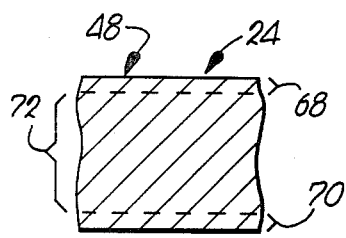
Fig.5.
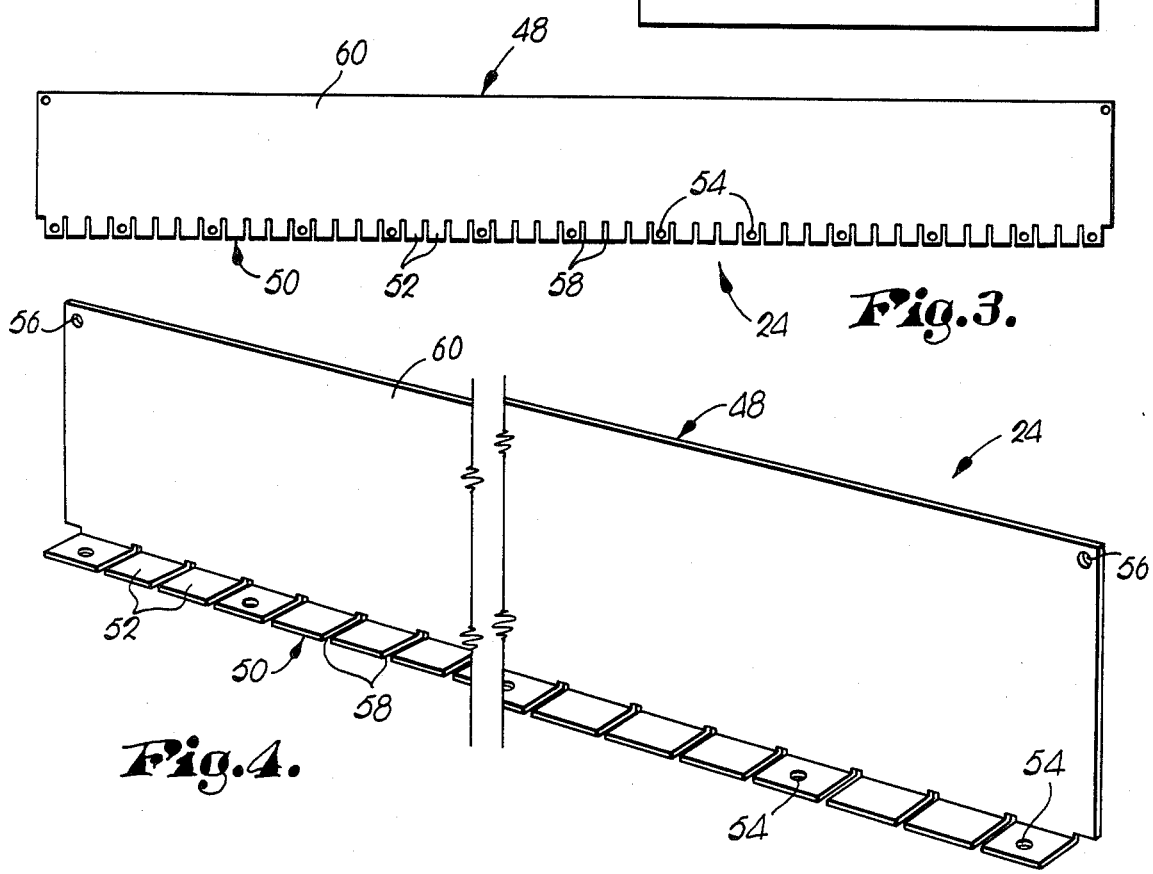
Fig.3.
Fig.4.

WRAPPED FAN CYLINDER FOR WATER COOLING TOWER

BACKGROUND OF THE INVENTION

1. Field of the Invention

This invention relates to a fan cylinder assembly constructed from an initially flat rectangular sheet of material and a flat support panel of a cooling tower which panel functions as a guide during forming of the sheet to an exact cylindrical configuration for surrounding a fan in closely adjacent relation to the tip of each fan blade. The cylinder is formed in such a fashion that bending stresses imposed on the sheet are minimized and do not exceed the nominal yield strength for at least 80% of the material in directions along the thickness of the same. In one embodiment of the invention, an annular member presenting an inner convex surface is secured to one side of the support panel opposite the fan cylinder to provide a reduced turbulence, eased inlet for air drawn into the fan cylinder.

2. Description of the Prior Art

Factory assembled cooling towers are characterized as practical, compact units which may be readily installed to provide an air conditioning duty typically within the range of 5 tons to 175 tons of cooling capacity. Cooling towers of this type customarily include an outer housing having an air inlet and an air outlet and supporting a quantity of tower fill between the inlet and outlet. Water to be cooled is distributed to an upper face of the fill and descends by gravity through the fill toward a lower collection basin, while air drawn through the housing and the fill by a fan thermally interacts with the descending water for cooling of the same.

Over the years, continuing efforts have been made toward optimizing the efficiency of cooling towers. One aspect of tower efficiency is related to the motor driven fan and the aerodynamic profile of the fans blades as well as the configuration of the tower housing or structure which defines the path through which the air is directed.

Fans for cooling towers are oftentimes located immediately adjacent and outside the regions of the tower housing containing the fill assembly, and the fan is surrounded by a fan cylinder which is concentrically mounted about a circular opening of a flat panel or support of the housing. It has been found that the efficiency of fan operation can be increased by minimizing the clearance between the outer tips of the fan blades and the inner surface of the fan cylinder. As a consequence, it is important to ensure that the cross-section of the fan cylinder adjacent the blades in a direction transverse to the axis of fan rotation is of an exact circular configuration which does not deform under stress or vibration over extended periods of tower operation to a non-circular configuration, since such deformation could otherwise lead to potentially damaging contact between the tip of the blades and the fan cylinder.

In some instances, fan cylinders comprised of an initially flat sheet of metallic material are "spun" to a configuration including a cylindrical portion surrounding the fan and a gently curved, outwardly flared portion which is mounted on a flat support panel of the tower housing. Cylinders of this type are spun on a forming machine by stretching the sheet metal past its yield strength in portions surrounding a circular hole in the metal until the sheet deflects laterally around the hole and permanently deforms to the desired, somewhat cylindrical configuration. However, such a forming process is costly and must be undertaken with care to ensure that the sheet does not tear or otherwise fail due to stress during the forming operation.

Occasionally, sheet metal is formed to a somewhat cylindrical configuration by a bending apparatus having a pair of spaced, side-by-side, fixed axis rollers and a third roller which is parallel to the two fixed axis rollers and which is selectively shiftable in a reference plane perpendicular to a plane extending through the axis of rotation of the other two rollers. Sheet metal is introduced to the bending apparatus along a path wherein one side of the sheet contacts the pair of fixed axis rollers and the third roller contacts the other side of the sheet. The sheet material is permanently "set" to an arcuate configuration by moving the third roller toward the space between the pair of rollers to a position wherein the tensile and compressive stresses imposed on the sheet are sufficient to overcome the memory of the same. Advancement of the sheet along the path stresses substantially the entire area of the metal past its yield point and deforms the sheet to produce a tubular shape.

Unfortunately, the above mentioned type of bending apparatus does not enable the user to precisely form the sheet matal to an exact cylindrical configuration within relatively small tolerances. One factor influencing the final configuration of the sheet metal is the exact, actual yield strength of the metal which varies from batch to batch and can also vary along the length of the same piece of material regardless of the fact that the sheet metal goods are often designated as having a nominal yield strength.

During use of the three roller bending apparatus, one side of the sheet experiences tensile stress and the opposite side experiences compressive stress, and to overcome the memory of the resilient sheet, the majority of the sheet is exposed to stress which exceeds the yield strength of the same. However, due to the aforementioned variations of actual yield strength portions of the sheet yield to a greater extent than other portions of the sheet even when all of the bending rollers are held in fixed positions and thus the exact radius of curvature of the formed sheet varies from portion to portion. As a consequence, the sheet must be shaped to a tubular dimension larger than the diameter of the swept blade path to ensure that the tips of the blades remain spaced from the cylinder at all times. The necessary, relatively large clearance between the blade tips and the inner surfaces of such fan cylinders in turn substantially reduces the efficiency of the fan and thereby the overall efficiency of the tower.

Moreover, fan cylinders which are of a substantially cylindrical configuration as opposed to the spun cylinders having an outwardly flared inlet region are known to cause turbulence in the air flow and separation of the air from the cylinder walls particularly adjacent the area where the inlet end of the cylinder fixedly abuts a flat panel of the cooling tower surrounding the circular outlet. It would be desirable, therefore, to provide a simple and economical means for reducing air turbulence and separation in towers having a fan cylinder of a substantially cylindrical configuration.

SUMMARY OF THE INVENTION

In order to overcome the above noted problems, the present invention is directed toward a fan cylinder of simplified construction that may be readily assembled in such a manner that stresses imposed upon an initially flat sheet material comprising the fan cylinder are minimized and approximately 80% of the thickness of the material is not exposed to a stress equaling the yield strength of the same. The inherent memory of the resilient fan cylinder material, being largely unaffected by yield stresses, thereafter retains the fan cylinder in an exact cylindrical configuration so that the clearance between the tip of the fan blades and the cylinder can be safely minimized.

More particularly, a flat support panel of the water cooling tower is provided with an accurately circular opening as well as a series of apertures each located at precise, predetermined positions in the panel around the periphery of the opening. An initially flat sheet is formed to present a plurality of spaced tabs extending in an direction perpendicular to remaining regions of the sheet, and certain of the tabs are provided with a hole positioned at a precise, predefined orientation relative to the tab and to remaining holes in the sheet.

During assembly of the flat sheet to the support panel of the tower, the sheet is flexed in an arc having a radius of curvature only slightly smaller than the radius of curvature of the circular opening so that the curved sheet can be fed through the opening, and simultaneously the holes in the tabs are aligned with a corresponding aperture in the support panel. As a consequence, the cylindrical shape of the formed sheet is determined by the exact circular periphery of the opening and is thereafter retained in a cylindrical configuration by fasteners extending through the holes and apertures. Preferably, the holes and apertures are constructed by a numerically controlled punching apparatus to enable the sheet to be formed to an exact cylindrical configuration once the holes are aligned with the apertures.

Stresses on the sheet comprising the fan cylinder are minimized during the bending operation by forming the sheet in an arc and simultaneously aligning the holes in the tabs with the apertures in the support panel. In this manner, the sheet need not be flexed to an arc having a radius of curvature substantially smaller than the radius of curvature of the circular opening in the support panel, and therefore stresses across the thickness of the material are minimized and permanent deformations of portions of the sheet do not occur, which could otherwise cause the configuration of the sheet to deviate from a true cylinder.

The cooling tower in certain forms of the invention is provided with an eased inlet comprising an annular member fixed to an inner surface of the support panel in concentric relation to the circular opening communicating with the fan cylinder. The annular member has a smoothly curved, convex configuration in reference sections taken radially of the member, and preferably is comprised of a relatively lightweight expanded foam material which can be easily manufactured and secured to the support panel during assembly of the tower. The annular, eased inlet member reduces turbulence within the flow of air travelling from the fill structure to the fan cylinder and prevents separation of the air from the fan cylinder wall, so that overall efficiency of the tower is improved.

BRIEF DESCRIPTION OF THE DRAWINGS

FIG. 1 is a side elevational view of a factory assembled cooling tower with a fan cylinder constructed in accordance with the principles of the present invention;

FIG. 2 is an enlarged front elevational view of a support panel of the tower housing shown in FIG. 1 and depicts a circular air discharge opening along with a series of apertures spaced around the periphery of the opening;

FIG. 3 is an enlarged plan view of an initially flat sheet which is subsequently shaped to form the fan cylinder of FIG. 1;

FIG. 4 is a fragmentary, enlarged, perspective view of the sheet shown in FIG. 3 after a series of tabs located along the length of the sheet have been bent toward an orientation extending perpendicular to remaining regions of the sheet;

FIG. 5 is a fragmentary, enlarged, cross-sectional view of the sheet of FIGS. 3-4, illustrating for exemplary purposes regions of the thickness of the sheet that are exposed to yield stresses during bending of the sheet;

DETAILED DESCRIPTION OF THE DRAWINGS

A water cooling tower 20 is shown in FIG. 1 and includes a housing 22 enclosing a quantity of fill structure. The housing 22 includes an inlet (not shown) for admitting air to the fill structure for thermal interaction of the air with water descending by gravity through the fill structure. The tower 20 as depicted in FIG. 1 represents a factory assembled unit; however, the principles of the present invention are readily applicable to certain types of towers that are built on-site.

Figure 7:
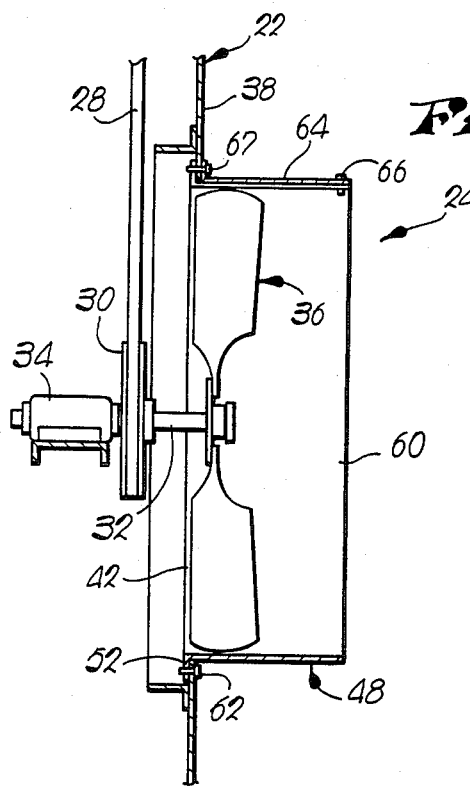
FIG. 7 is an enlarged, fragmentary, side cross-sectional view of the cooling tower shown in FIG. 1 particularly depicting the assembled fan cylinder and the relationship of a fan to the same.

A fan cylinder assembly, broadly designated 24, is mounted on the side of tower 20 as shown in FIG. 1 and defines an outlet for discharging air passing through the fill structure. An electric motor 26 atop tower 20 drives an endless belt 28 received around a pulley 30 (FIG. 7). The pulley 30 is fixed to a shaft 32 rotatably carried by a bearing housing 34, and a fan 36 secured to shaft 32 remote from bearing housing 34 is centrally located within fan cylinder 24.

A flat, upright support panel 38 forms part of the housing 22 of tower 20 and has a circular edge 40 defining a circular opening 42. A series of relatively small apertures 44 are spaced equally around the periphery of the opening 42 in adjacent, spaced relationship to edge 40. Each aperture is located at a precise, predetermined position relative to the opening 40 and to the remaining apertures 44 and is preferably established by means of a numerically operated punching apparatus. Additionally, a small notch 46 is provided in edge 40 at the top of opening 42 along with an associated aperture 44a for purposes to be explained hereinunder.

Viewing FIG. 3, an initially flat rectangular sheet 48 has an edge region 50 along the longer side thereof which is formed to present a plurality of spaced tabs 52. Certain of the tabs 52 are provided with holes 54 which are positioned at a precise, predefined orientation relative to the corresponding tab 52 and to the remaining holes 54. In addition, two small holes 56 are placed in the two corners of sheet 48 remote from edge region 50.

As is shown in FIG. 4, each of the tabs 52 is formed by a bending operation to extend in a direction perpendicular to a remaining major region 60 of the sheet 48. The bending operation for tabs 52 is performed along an axis which is parallel to the longitudinal axis of edge region 50 and which is slightly below the top of each slot 58 located between adjacent tabs 52.

During assembly of the fan cylinder 24, the major region 60 of sheet 48 is bent in an arc and inserted through opening 42 from the front or exterior side of the upright support panel 38. While region 60 is formed to an arc, each of the holes 54 of corresponding tabs 52 is aligned with a corresponding aperture 44 in the support panel 38, and tabs 52 are thereafter affixed to panel 38 by means of a screw 62 received in each aperture 44 and threaded in corresponding hole 54. As a consequence, the precise, predefined positions of the apertures 44 and holes 54 permit the fan cylinder 24 to be formed to an exact cylindrical configuration using, in part, the accurate circular edge 40 of the circular opening 42 as a guide. Major region 60 bears directly against the exact circular opening 42, and this direct bearing contact in cooperation with the precisely located tab holes 54 and panel apertures 44 causes major region 60 to be retained in an exact cylindrical shape.

Figure 6:
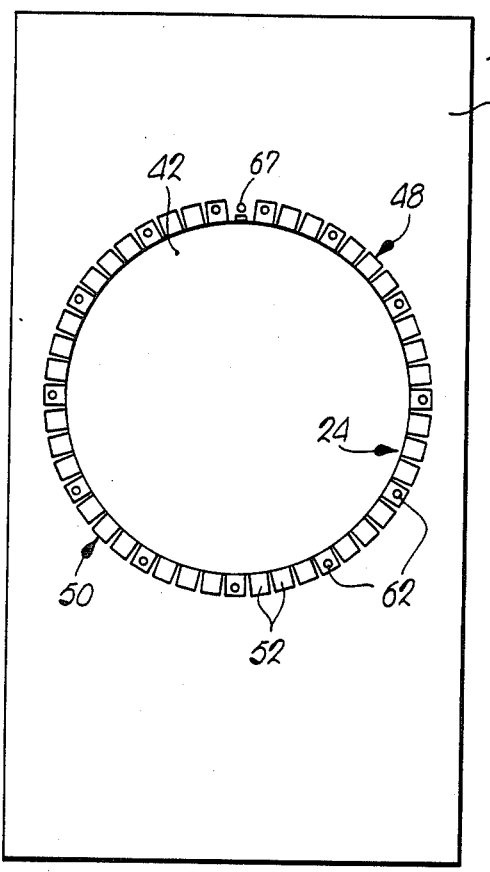
FIG. 6 is a rear elevational view of the support panel shown in FIG. 2 after the sheet illustrated in FIG. 4 is affixed to the panel with holes in the tabs aligned with the apertures of the panel.
Figure 8:
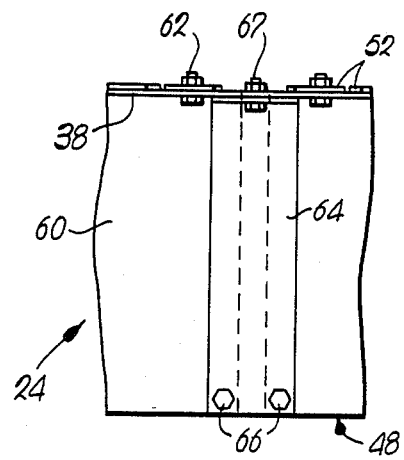
FIG. 8 is an enlarged, fragmentary, plan view of the fan cylinder shown in FIG. 1 and depicting in detail a splice plate removably interconnecting opposite ends of the fan cylinder sheet.
Figure 9:
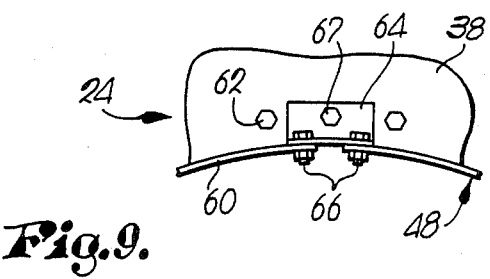
FIG. 9 is an enlarged, fragmentary, front elevational view of the fan cylinder with the splice plate shown in FIG. 8.

In order to complete assembly of fan cylinder 24, an L-shaped splice plate 64, as depicted in FIGS. 8 and 9 is secured to corner holes 56 in sheet 48 by fasteners 66, and a single fastener 67 extending through the shorter leg of splice plate 64 is removably threaded into aperture 44a of support panel 38. The detachable splice plate 64 functions to provide rigidity to the spaced, opposed ends of sheet 48 and also serves to removably cover notch 46 which otherwise provides clearance for installation of a replacement belt 28 when necessary.

The sheet 48, including major region 60, is comprised of a resilient material having a yield strength and a significant memory which can be overcome by deflection of the sheet 48 laterally to impose stress on the majority of the sheet material that is greater than the yield strength of the same. However, during flexure of the major region 60 of sheet 48 to form fan cylinder 24, the outer surface of region 60 is not bent to an arc that is smaller than the radius of curvature of edge 40 defining opening 42. As a consequence, tensile and compressive stresses exerted on the sheet 48 across the thickness of the same are minimized. The stresses imposed on region 60 are, for the most part, below the yield strength of the material in order to avoid permanent deformation of the same which could otherwise substantially preclude the fan cylinder 24 from attaining an exact cylindrical configuration.

FIG. 5 represents an illustrative, schematic depiction of the thickness of the sheet 48 delineated by dashed lines showing various regions of stress. During shaping of sheet 48 to a cylindrical configuration, an outer region of the sheet 48 designated as 68 in FIG. 5 and having a thickness of up to ten percent of the thickness of sheet 48 may, for instance, be exposed to tensile stresses which exceed the nominal yield strength of the material. Simultaneously, inner region 70, also having a thickness of up to ten percent of the thickness of sheet 48, can be exposed to compressive stresses which may exceed the nominal yield strength of the material. However, the remaining middle region 72 of sheet 48, which has a thickness constituting eighty percent or more of the thickness of sheet 48, experiences either tensile or compressive stresses which are less than the nominal yield strength of the material. As a consequence, it can be appreciated that the relatively large middle region 72 is not permanently deformed by stress and thus the inherent memory of resilient sheet 48 retains the latter in a true cylindrical configuration once holes 54 have been aligned with apertures 44. Of course, it is also possible to form the sheet 48 to a radius of curvature wherein up to one hundred percent of the thickness of sheet 48 experiences only stresses which are below the yield strength.

In preferred embodiments of the invention, the number of tabs 52 along the length of the sheet 48 is in the range from approximately 30 to approximately 160 regardless of the diameter of the assembled fan cylinder 24. Better results are obtained, however, when the number of tabs 52 along the length of sheet 48 is in the range from approximately 45 to approximately 80 regardless of diameter of assembled fan cylinder 24. The latter range of 45 to 80 tabs corresponds to a tab width equal to approximately four percent to approximately seven percent of the diameter of the assembled fan cylinder 24.

Good results have been observed when the material comprising the sheet 48 consists essentially of galvanized sheet carbon steel manufactured in accordance with ASTM Standards designated A-446-A, which provide for a minimum tensile strength of 45,000 psi and a minimum yield strength of 33,000 psi. The thickness of the sheet 48 advantageously varies in accordance with the diameter of the fan cylinder 24, and it has been found for example that 14 gauge sheet metal, having a thickness of 0.075", may be used on fan cylinders 66" in diameter while 16 gauge sheet metal (0.060" in thickness) may be utilized for fan cylinders 42" to 54" in diameter. The material comprising support panel 38 optionally can be formed of the same type and thickness of material comprising sheet 48.

By practice of the present invention, it has been found that the overall cost of the fan cylinder 24 is reduced considerably in comparison to fan cylinders which are spun. Moreover, use of the numerically controlled punching apparatus enables the circular edge 40 of the opening 42 in the flat support panel 38 to form the guide for the shape of the cylindrical major region 60 of sheet 48, so that clearance between the tip of the fan blades 36 and the inner surface of the fan cylinder 24 may be minimized in order to optimize fan efficiency.

Figure 10:
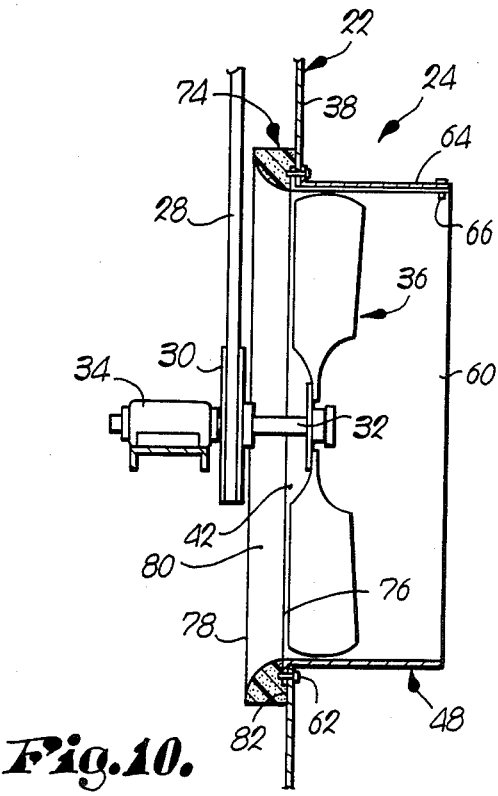
FIG. 10 is a view similar to FIG. 7 with the addition of an expanded foam eased inlet surrounding the fan cylinder opening in accordance with an alternate embodiment of the invention.

FIG. 10 depicts another embodiment of the invention, wherein an annular member 74 functions as an eased inlet for air exiting the fill structure within tower 20 and entering fan cylinder 24. The annular member 74 is initially separate from support panel 38 and is preferably comprised of a relatively light-weight, expanded foam material.

More particularly, the annular member 74 has a circular inner edge portion 76 of a diameter substantially equal to the diameter of opening 42 in support panel 38. The member 74 is fixed to the support panel 38 at a location wherein the circular inner edge portion 76 is in closely adjacent and concentric relationship to the circular opening 42 leading to fan cylinder 24. The member 74 also has a substantially circular outer edge portion 78 spaced from the inner edge portion 76 and of a diameter larger than the latter.

The annular member 74 has a surface 80 which interconnects the inner edge portion 76 and the outer edge portion 78. The surface 80 has a smoothly curved, convex configuration in reference sections taken radially of the member 74, and in certain forms of the invention, the surface 80 has a cross-section resembling a quarter circle. Finally, a flat surface 82 of member 74 is oriented in a radial direction relative to the annular member 74 and lies in direct, flat contact with a flat portion of the upright support panel 38 surrounding opening 42.

As a consequence, the cross-sectional configuration of member 74 enables the same to serve as an eased inlet for air directed into fan cylinder 24, and is especially advantageous in view of the fact that the fan cylinder 24 has a cylindrical configuration directly adjacent flat support panel 38 defining housing 22 of tower 20. Thus, member 74 reduces turbulence of air flowing from the fill structure of tower 20 into the fan cylinder 24.

We claim:

1. A fan cylinder assembly comprising:
   a support having a generally circular opening;
   an initially flat sheet having a major region with a certain thickness and an edge region with a plurality of spaced tabs bent to extend in a direction substantially perpendicular to said major region,
   said major region of said sheet being comprised of a resilient material having a yield strength and a significant memory which can be overcome when said major region is deflected laterally to impose stress greater than said yield strength to the majority of said material comprising said major region,
   said major region of said sheet being formed to a cylindrical configuration,
   at least eighty percent of said material comprising said major region in directions along the thickness of said sheet being subjected to stress less than the yield strength of said material when said major region is formed to said cylindrical configuration to enable the memory of said at least eighty percent of said resilient material to bias said major region to an exact cylindrical configuration; and
   means for affixing certain of the tabs to said support at precise, predetermined positions spaced around said opening to cause said major region of said sheet to bear against said circular opening and to thereafter retain said major region of said sheet in said exact, cylindrical configuration.

2. The invention as set forth in claim 1, wherein the number of said plurality of tabs is in the range of from approximately 30 to approximately 160.

3. The invention as set forth in claim 1, wherein the number of said plurality of tabs is in the range of from approximately 45 to approximately 80.

4. A method of assembling a fan cylinder for a water cooling tower comprising the steps of:
   forming a circular opening having a certain radius of curvature in a flat portion of a support;
   shaping an edge region of the long side of an initially flat, rectangular sheet to form a plurality of spaced tabs each extending in a direction perpendicular to substantially the remaining regions of said sheet;
   bending said remaining regions of said sheet in an arc having a radius of curvature on the outside surface of said sheet equal to said radius of curvature of said circular opening while positioning said tabs at precise, predetermined locations of said support flat portion for forming said remaining regions of said sheet to an exact cylindrical configuration by bending said sheet to a radius of curvature slightly less than said certain radius of curvature of said opening, thereby minimizing tensile and compressive stresses on the outer and inner surfaces of said sheet respectively; and
   affixing said tabs of said sheet to said flat support portion to thereafter retain said remaining regions of said sheet in said exact cylindrical configuration.

5. The method as set forth in claim 4, wherein the number of said plurality of tabs is in the range of from approximately 30 to approximately 160.

6. The method as set forth in claim 5, wherein the number of said plurality of tabs is in the range of from approximately 45 to approximately 80.

7. The method as set forth in claim 4; including the step of placing said remaining regions of said sheet within said circular opening of said support portion to locate said tabs on one side of said support with the remaining regions of said sheet extending away from the latter on the opposite side of said support.

8. A method of assembling a fan cylinder for a water cooling tower comprising the steps of:
   forming a circular opening having a certain radius of curvature in a flat portion of a support;
   establishing in said flat support portion a series of apertures spaced around the periphery of said circular opening, each aperture being located at a precise, predetermined position relative to said circular opening and to the remaining apertures;
   shaping an edge region of the long side of an initially flat rectangular sheet to form a plurality of spaced tabs each extending in a direction perpendicular to substantially the remaining regions of said sheet;
   providing a series of holes each located in a corresponding one of certain of said tabs and positioned at a precise, predefined orientation relative to the corresponding tab and to the remaining holes;
   bending said remaining regions of said sheet in an arc having a radius of curvature slightly less than the radius of curvature of said circular opening while aligning each of said holes in said tabs with a corresponding one of said apertures in said flat support portion for forming said remaining regions of said sheet to an exact cylindrical configuration without causing said sheet to be flexed to an arc having a radius of curvature substantially smaller than said certain radius of curvature of said circular opening, thereby minimizing the yield stresses imposed on said sheet during said step of bending; and
   inserting fastener means in said holes and said apertures to secure said tabs to said support for thereafter retaining said remaining regions of said sheet in said exact cylindrical configuration.

9. In combination:
   cooling tower structure including a support;

a fan cylinder mounted to said support and presenting a circular intake opening; and an annular member initially separate from said support and having a circular inner edge portion of a diameter substantially equal to the diameter of said circular intake opening, said member being fixed to said support at a location wherein said circular inner edge portion of said member is in closely adjacent and concentric relationship to said circular intake opening of said fan cylinder, said member having a substantially circular outer edge portion of a diameter larger than said inner edge portion, said member presenting a surface interconnecting said inner edge portion and said outer edge portion, said surface having a smoothly curved, convex configuration in reference sections taken radially of said member thereby presenting an eased inlet for the flow of air to said fan cylinder, said support having a flat portion surrounding said circular intake opening of said fan cylinder, and said member having a flat surface oriented in a radial direction relative to said annular member, said flat surface directly and fixedly contacting said flat portion of said support, said member being comprised of a relatively lightweight expanded foam material.

* * * * *